(12) United States Patent
Kim et al.

(10) Patent No.: US 9,600,907 B2
(45) Date of Patent: Mar. 21, 2017

(54) PAINTBRUSH AND LIQUID SIMULATION

(71) Applicant: Adobe Systems Incorporated, San Jose, CA (US)

(72) Inventors: Byungmoon Kim, Sunnyvale, CA (US); Nathan A. Carr, San Jose, CA (US); Zhili Chen, Columbus, OH (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/553,894

(22) Filed: Nov. 25, 2014

(65) Prior Publication Data

US 2016/0148395 A1    May 26, 2016

(51) Int. Cl.
  *G06T 11/40* (2006.01)
  *G06T 11/00* (2006.01)
  *G06F 3/03* (2006.01)

(52) U.S. Cl.
  CPC .............. *G06T 11/001* (2013.01); *G06F 3/03* (2013.01); *G06T 11/40* (2013.01); *G06T 2207/10024* (2013.01); *G06T 2210/24* (2013.01)

(58) Field of Classification Search
  None
  See application file for complete search history.

(56) References Cited

U.S. PATENT DOCUMENTS

| | | | | |
|---|---|---|---|---|
| 6,348,924 B1* | 2/2002 | Brinsmead | ............ | G06T 11/203 345/441 |
| 8,335,675 B1* | 12/2012 | DiVerdi | ................. | G06T 13/80 434/81 |
| 8,379,047 B1 | 2/2013 | DiVerdi | | |
| 2010/0027907 A1* | 2/2010 | Cherna | ................. | G06T 11/001 382/274 |
| 2013/0120433 A1* | 5/2013 | DiVerdi | ................ | G06T 11/001 345/593 |

(Continued)

OTHER PUBLICATIONS

B. Baxter et al., "DAB: Interactive Haptic Painting with 3D Virtual Brushes," Proc. 28th Siggraph, ACM Press, 2001, pp. 461-468.*

(Continued)

*Primary Examiner* — Xiao M. Wu
*Assistant Examiner* — Steven Elbinger
(74) *Attorney, Agent, or Firm* — Wolfe-SBMC

(57) ABSTRACT

Paintbrush and liquid simulation techniques are described. In one or more implementations, input is received to perform brush strokes with a virtual paintbrush on a virtual canvas. For virtual paint on the virtual canvas, lifelike paint qualities are simulated. However, the lifelike paint qualities are simulated solely for the virtual paint that is within a region of the canvas. The lifelike paint qualities are not simulated for virtual paint located outside the region. As part of simulating the interaction between the virtual paint, the virtual paintbrush, and the virtual canvas, various parts of the simulation may be performed by different processing units. For example, bristles of the virtual paintbrush may be simulated utilizing a first processing device such as a central processing unit (CPU). A second processing unit, such as a graphics processing unit (GPU), may be employed to simulate the lifelike effects of the virtual paint.

20 Claims, 8 Drawing Sheets

(56) References Cited

U.S. PATENT DOCUMENTS

| | | | |
|---|---|---|---|
| 2013/0127898 A1* | 5/2013 | DiVerdi | G06T 11/203 |
| | | | 345/600 |
| 2013/0229390 A1* | 9/2013 | DiVerdi | G06F 3/0488 |
| | | | 345/179 |
| 2014/0081610 A1 | 3/2014 | DiVerdi | |
| 2014/0132619 A1* | 5/2014 | Landsberger | G06T 11/001 |
| | | | 345/589 |

OTHER PUBLICATIONS

Chu, et al., "Real-Time Painting with an Expressive Virtual Chinese Brush", IEEE Computer Society, Sep./Oct. 2004, Sep. 2004, pp. 76-85.

Nelson, "An Efficient Brush Model for Physically-Based 3D Painting", Proc. of Pacific Graphics, Oct. 9-11, 2002, Beijing, China, IEEE Press, Oct. 2002, 9 pages.

Zhu, et al., "A New Grid Structure for Domain Extension", SIGGRAPH 2013, ACM TOG 32, 63.1-63.8 (2013), 2013, 8 pages.

"Combined Search and Examination Report", GB Application No. 1513419.0, Jan. 18, 2016, 8 pages.

* cited by examiner

PAINTBRUSH AND LIQUID SIMULATION

BACKGROUND

Conventional techniques for painting with a computer are generally implemented using at least one of two approaches: a procedural approach and a simulation approach. Procedural approaches are computationally fast but limit the lifelike painting effects that can be simulated. Procedural approaches typically involve the interpolation of fixed two-dimensional (2D) images, which is referred to as "stamping". Stamping, however, may fail to model lifelike interaction of a virtual paintbrush with virtual paint.

In contrast, simulation approaches can be described as simulating liquids on canvas as 2D height fields, or as simulating seeping, percolation, and dispersion behaviors of virtual paint inside a virtual canvas. However, most simulation approaches simply inject liquids into canvas, and stir the liquid using a fixed brush shape. Due to these limitations, conventional techniques for simulating the interaction between a virtual paintbrush, virtual paint, and a virtual canvas may not do so in a realistic manner.

SUMMARY

Paintbrush and liquid simulation techniques are described. In one or more implementations, input is received to perform one or more brush strokes with a virtual paintbrush on a virtual canvas. For virtual paint on the virtual canvas, lifelike paint qualities are simulated. However, the lifelike paint qualities are simulated solely for the virtual paint that is within a region of the canvas. The lifelike paint qualities are not simulated for virtual paint located outside the region. By way of example, the lifelike painting qualities that are simulated may include an appearance of the virtual paint, flow of the virtual paint between the virtual canvas and the virtual paintbrush, and velocity of the virtual paint.

As part of simulating the interaction between the virtual paint, the virtual paintbrush, and the virtual canvas, various parts of the simulation may be performed by different processing units. For example, bristles of the virtual paintbrush may be simulated at a first processing device such as a central processing unit (CPU). In conjunction with simulating the bristles, a bristle density map may be computed. The bristle density map may then be communicated to a second processing unit such as graphics processing unit (GPU). The second processing unit may be employed to simulate the lifelike effects of the virtual paint. In conjunction with doing so, a fluid surface map may be computed. The fluid surface map may be communicated to the first processing unit and used to simulate the bristles of the virtual paintbrush. Additionally, the fluid surface map may be used to render a volume of the virtual paint for display. In this way, interaction of the virtual paintbrush with the virtual paint and the virtual canvas may appear lifelike near the virtual paintbrush.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
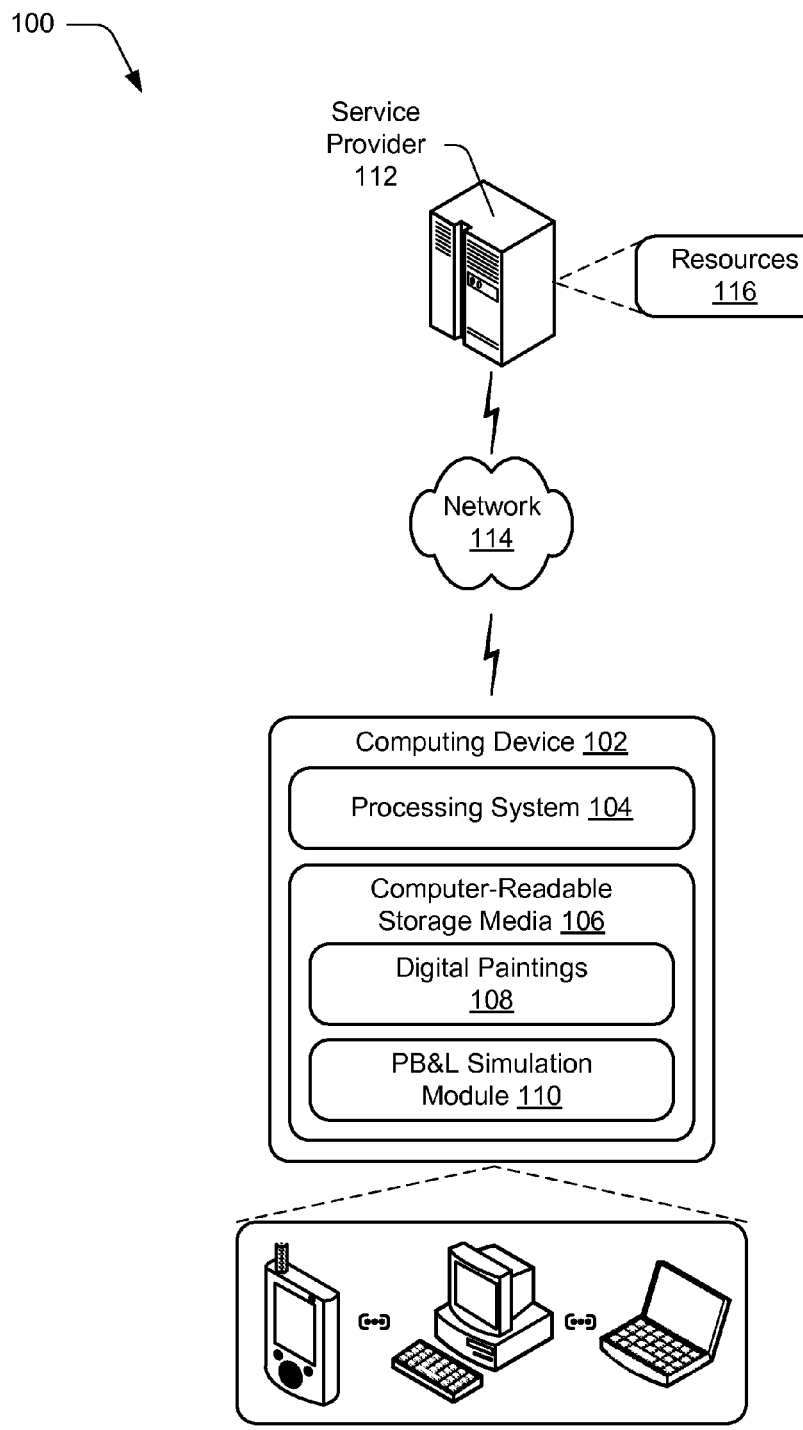
FIG. 1 is an illustration of an environment in an example implementation that is operable to employ techniques described herein.

Conventional techniques for simulating interactions between virtual paint, a virtual paintbrush, and a virtual canvas, in association with painting applications, may not do so in a realistic manner. Some conventional techniques that are computationally fast may not be able to simulate qualities of virtual paint in a lifelike manner, for example. Other conventional techniques may use a virtual paintbrush having a fixed shape. However, a fixed shape is not reflective of the way paintbrushes respond in physical world painting. Although some conventional techniques use flexible paintbrushes, these techniques do so in a limited manner. For example, some of these conventional approaches model a virtual paintbrush as a skeleton having a surface mesh. By doing so, however, effects that result from the interaction of individual paintbrush bristles are missing. Other conventional techniques for virtual painting that use a flexible paintbrush suffer from a variety of other deficiencies. Consequently, users may find computer painting that is simulated according to conventional techniques to be unrealistic.

Paintbrush and liquid simulation techniques are described. In one or more implementations, lifelike qualities are simulated for interactions between virtual paint, a virtual paintbrush, and a virtual canvas. Unlike conventional techniques, the lifelike qualities are simulated for a limited region of the virtual canvas. In particular, the lifelike qualities are simulated within a region near the virtual paintbrush.

As the virtual paintbrush moves across the virtual canvas (e.g., according to new brush strokes), the region for which the lifelike qualities is simulated follows the virtual paintbrush. The lifelike qualities are not simulated for virtual paint that is not within the region, e.g., that which is beyond a boundary of the region.

As the region is updated to follow the virtual paintbrush, simulation of the lifelike qualities may be ceased for those portions of the virtual canvas that are no longer in the region to be simulated. By limiting simulation of the lifelike qualities solely to the region, computing resources may be able to simulate the qualities of the virtual paint therein with a high degree of detail. Furthermore, limiting the simulation of the lifelike qualities solely to the region may enable a canvas to be used that is larger than conventional techniques.

In addition to limiting simulation of the lifelike qualities to a region of the canvas near the virtual paintbrush, the workload for performing the simulation may be separated between multiple different processing units. By way of example, the workload may be split between a central processing unit (CPU) and graphics processing unit (GPU). The CPU, for instance, may perform a bristles simulation for the bristles of a virtual paintbrush. Information indicative of this simulation may then be communicated to the GPU. Using this information, the GPU may perform a fluid simulation for the virtual paint. Information indicative of the fluid simulation may then be communicated back to the GPU for use in performing the bristles simulation. The CPU and GPU may perform these tasks throughout the simulation. Information computed by the CPU and the GPU be usable to render the interaction of the virtual paint with the virtual paintbrush and the virtual canvas for display.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that may include one or more processing devices (e.g., processors) and one or more computer-readable storage media 106. The illustrated environment 100 also includes digital paintings 108 and a paintbrush and liquid simulation module 110 (PB&L simulation module 110) embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 112, configured to communicate with computing device 102 over a network 114, such as the Internet, to provide a "cloud-based" computing environment. Generally speaking, service providers 112 are configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, content creation services that offer painting and drawing applications (e.g., Fresh Paint®, Creative Cloud®, and the like), drawing and painting storage and/or sharing services, social network services (e.g., Facebook®, Twitter®, Instagram®, Hyperlapse®, and the like), and so forth.

These sources may serve as significant amounts of image content. Such digital paintings may be formatted in any of a variety of image formats, including but not limited to JPEG, TIFF, RAW, GIF, BMP, PNG, and so on. The digital paintings made available through the services may be posted by users that have accounts with those services. For example, a user having an account with a painting storage and/or sharing service may upload paintings, such as those created with a painting application, or those sent to the user via electronic means. A user of the painting storage and/or sharing service may then share their uploaded paintings with others, such as by providing a link to a painting collection or to a profile of the user.

The PB&L simulation module 110 represents functionality to implement paintbrush and liquid simulation techniques as described herein. For example, the PB&L simulation module 110 may be configured in various ways to simulate lifelike qualities for interactions involving virtual paint that is applied to a virtual canvas with a virtual paintbrush. For instance, the PB&L simulation module 110 may be configured to simulate lifelike qualities such as an appearance of the virtual paint, flow of the virtual paint on the virtual canvas, flow of the virtual paint between the virtual paintbrush and the virtual canvas, and so on.

In the physical world, paint may continue to flow over and seep into a canvas at regions away from a paintbrush. However, the amount paint changes at those regions (e.g., due to flow, seepage, and the like) is generally far less than the amount paint changes near the brush (e.g., as a result of brush strokes, being freshly applied, and so on). Based on this observation, the PB&L simulation module 110 may simulate the lifelike qualities for interactions involving virtual paint within a region of the virtual canvas around the virtual paintbrush. However, in one or more implementations the PB&L simulation module 110 does not simulate the lifelike qualities for virtual paint that is located outside of the region. Although ceasing simulation of lifelike qualities for virtual paint outside the region may cause that virtual paint to appear less lifelike, doing so may free up computing resources so that the lifelike qualities may be simulated for the virtual paint within the region. Consequently, more detailed qualities may be simulated within the region causing the paint within the region to appear more lifelike than conventional techniques.

In addition, the PB&L simulation module 110 may represent functionality to split the workload (e.g., the computing workload) associated with simulating the interaction among multiple processing units. For example, the PB&L simulation module 110 may split the computing workload between a central processing unit (CPU) and a graphics processing unit (GPU). To do so, the PB&L simulation module 110 may employ the CPU to perform some operations of the techniques described herein and the GPU to perform others. As an example, the PB&L simulation module 110 may employ the CPU to compute a bristle density map for the virtual paintbrush and the GPU to compute a fluid surface map for the virtual paint deposited on the virtual canvas.

The interaction between the virtual paint, the virtual paintbrush, and the virtual canvas that is simulated may be displayed through a user interface. The techniques described herein may enable a user of a painting application to perform inputs that cause a virtual paintbrush to make virtual brush strokes on a virtual canvas. Accordingly, as input is received for the brush strokes, the simulation may cause the virtual paint to appear to move in a lifelike manner as a result of the brush strokes.

The PB&L simulation module 110 may be implemented as a software module, a hardware device, or using a combination of software, hardware, firmware, fixed logic circuitry, etc. Further, the PB&L simulation module 110 may be implemented as a standalone component of the computing device 102 as illustrated. In addition or alternatively, the PB&L simulation module 110 may be configured as a component of a web service, an application, an operating system of the computing device 102, a plug-in module, or other device application as further described in relation to FIG. 8.

Having considered an example environment, consider now a discussion of some example details of the techniques for paintbrush and liquid simulation in accordance with one or more implementations.

Paintbrush and Liquid Simulation Details

Figure 2:
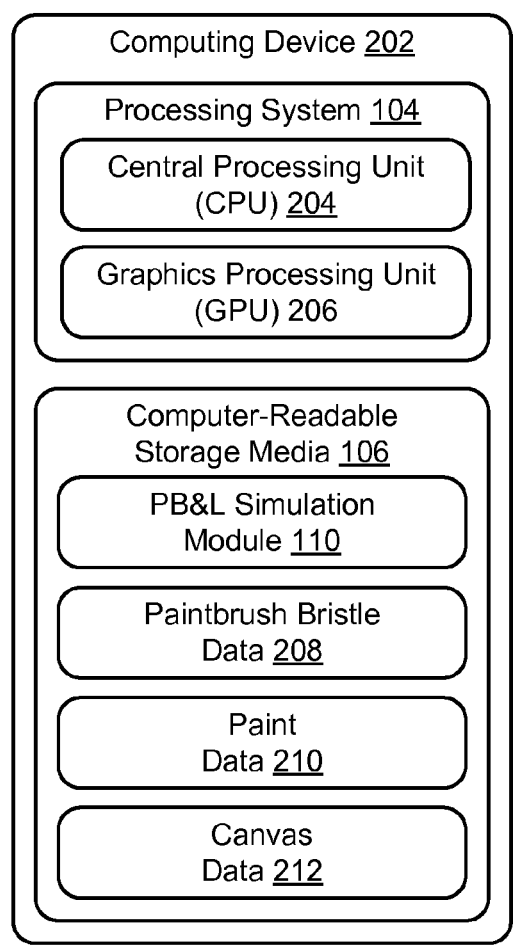
FIG. 2 illustrates from the environment of FIG. 1 a computing device having a virtual paintbrush and liquid simulation module and multiple processing units that it can employ to implement a simulation in greater detail.

This section describes some example details of paintbrush and liquid simulation techniques in accordance with one or more implementations. FIG. 2 depicts generally at 200 some portions of the environment 100 of FIG. 1, but in greater detail. In particular, the processing system 104 and the computer-readable storage media 106 of a computing device are depicted in greater detail.

In FIG. 2, the processing system 104 is illustrated as part of computing device 202 and includes a central processing unit 204 (CPU 204) and a graphics processing unit 206 (GPU 206). The computer-readable storage media 106 is also illustrated as part of the computing device 202 and includes the PB&L simulation module 110, paintbrush bristle data 208, paint data 210, and canvas data 212. The discussion of the components depicted in FIG. 2 may refer to FIGS. 3-5, which illustrate aspects of paintbrush and liquid simulation.

In general, the PB&L simulation module 110 may employ different processing units (e.g., CPU 204 and GPU 206) to simulate interaction of virtual paint with a virtual paintbrush and a virtual canvas. In conjunction with the terms "paint," "paintbrush," and "canvas," the term "virtual" may refer to the paint, paintbrush, and canvas being simulated, e.g., as part of a painting application (not shown) executed on the computing device 202. Using the techniques described herein, however, the simulation of the interaction between virtual paint, virtual paintbrush, and virtual canvas may appear more lifelike than simulations that use conventional techniques.

Figure 3:
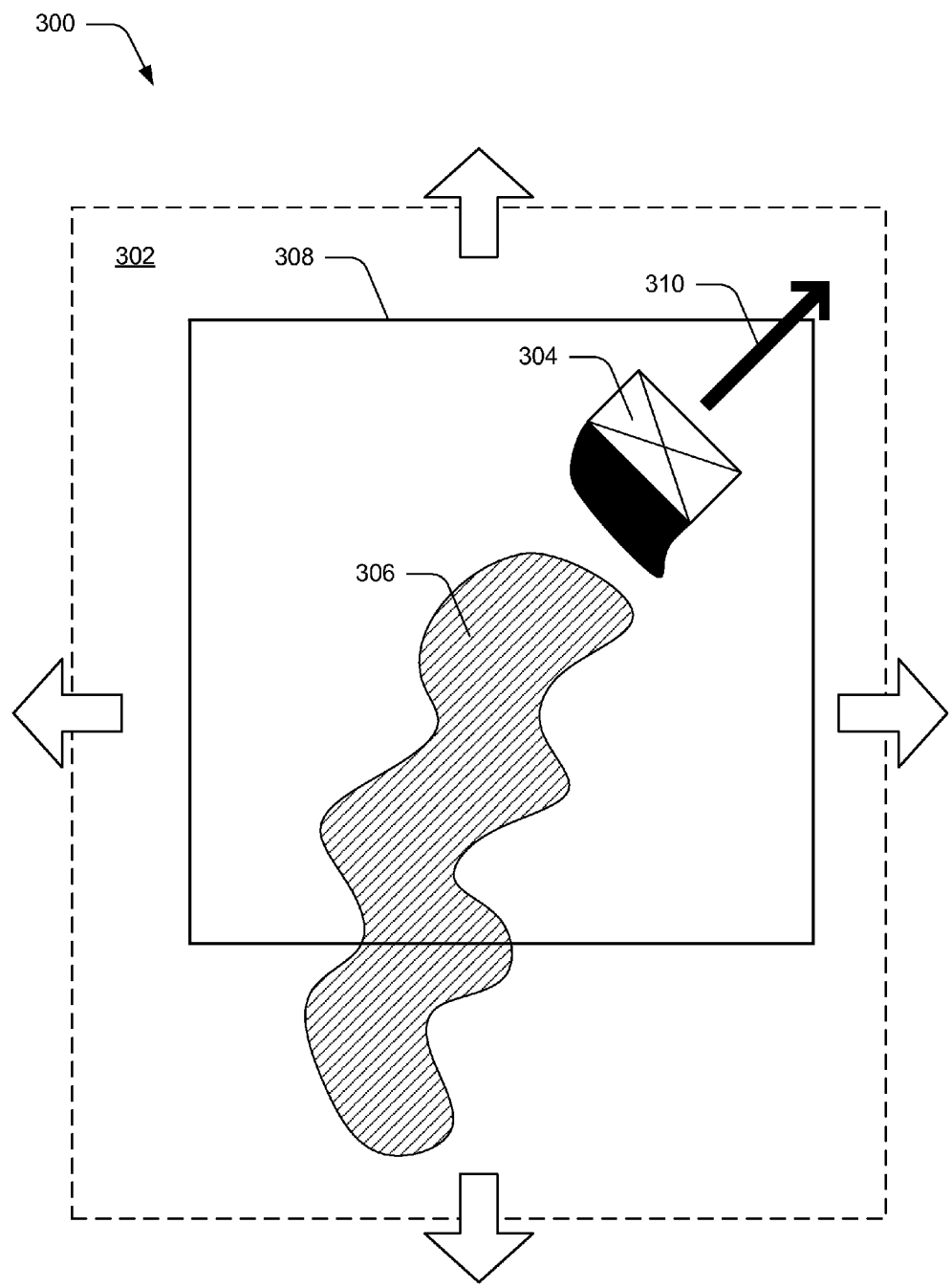
FIG. 3 illustrates an example of virtual paint being applied to a virtual canvas using a virtual paintbrush and an example of a region within which a simulation of the interaction is performed.

FIG. 3 illustrates an example at 300 in which virtual paint is applied to a virtual canvas using a virtual paintbrush, and an example of a region within which a simulation of the interaction is performed. In particular, FIG. 3 depicts virtual canvas 302, virtual paintbrush 304, and virtual paint 306. FIG. 3 may also represent a scenario in which input received from a user to perform brush strokes with the virtual paintbrush 304 is effective to apply the virtual paint 306 to the virtual canvas 302. The virtual canvas 302 is illustrated with arrows to indicate that it may extend in any direction beyond the extent illustrated. It should be appreciated that the virtual canvas 302 may have a variety of shapes without departing from the spirit or the scope of the techniques described herein. By way of example and not limitation, the virtual canvas 302 may have a shape that is rectangular, circular, triangular, oval-shaped, and so forth.

In general, simulating lifelike qualities of painting is expensive in terms of computing resources. Due to the limits of computing resources, simulating lifelike painting qualities for virtual paint over an entire virtual canvas may not be feasible for some computing devices. Nevertheless, computing devices may have computing resources that are sufficient to implement limited simulations. Some conventional techniques, for instance, may simulate paint qualities over an entire virtual canvas. However, the detail with which the virtual paint is simulated using those techniques may not result in a lifelike appearance of the virtual paint. Unlike conventional techniques, the paintbrush and liquid simulation techniques described herein may result in a lifelike appearance of virtual paint near the virtual paintbrush.

To simulate virtual painting so that it appears to be lifelike near a virtual paintbrush, the PB&L simulation module 110 may limit simulation of one or more lifelike paint qualities to a region of the virtual canvas around the virtual paintbrush. In FIG. 3, the virtual canvas 302 is depicted with region 308. Within the region 308, the lifelike qualities of the virtual paint 306 may be simulated in great detail. The lifelike qualities that are simulated can include a lifelike appearance of the paint, fluid properties of the paint (e.g., flow, seepage, etc), drying properties of the paint (and effects of the drying on the fluid properties), and so on. It is to be appreciated that other lifelike qualities may be simulated within the region 308 for interactions involving virtual paint without departing from the spirit or scope of the techniques described herein.

However, the entire set of lifelike qualities (e.g., those that are simulated for the virtual paint within the region 308) are not simulated for the virtual paint 306 outside of the region 308. By way of example, the fluid properties may not be simulated for the virtual paint 306 outside the region 308. Instead, the virtual paint outside of the region 308 appear to be "frozen", which may result in ceasing simulation of the virtual paint's fluid properties (e.g., flow and seepage). Even though the virtual paint 306 outside the region 308 may no longer move (e.g., because simulation of its fluid properties has been ceased), its appearance may otherwise be lifelike.

As input to perform brush strokes is received, the PB&L simulation module 110 may change the region 308 within which the lifelike qualities are simulated. By way of example, the region within which the lifelike qualities are simulated may have previously been located down and left from where the region 308 is depicted in FIG. 3. Thus, when the portion of the virtual paint 306 depicted outside the region 308 was applied, it may have been within the region then being simulated. Given this, the PB&L simulation module 110 may have simulated the entire set of lifelike paint properties for that portion of the virtual paint 306 at a time it was applied. As input for more brush strokes was received, however, the PB&L simulation module 110 may have changed the region within which the lifelike qualities are simulated.

To change the region within which the lifelike paint qualities are simulated, the PB&L simulation module 110 may determine a velocity of the virtual paintbrush 304. In the example at 300 arrow 310 represents this velocity. The determined velocity is indicative of both a speed and a direction of the virtual paintbrush 304 as it moves over the virtual canvas 302. The PB&L simulation module 110 may determine the velocity based on input received to perform brush strokes with the virtual paintbrush 304.

In addition to using velocity of the virtual paintbrush 304 to change the region within which the lifelike paint qualities are simulated, the PB&L simulation module 110 may also use a prior trajectory of the virtual paintbrush 304. By way of example, the PB&L simulation module 110 may determine a prior rate of bending and curvature change of the virtual paintbrush 304. To do so, the PB&L simulation module 110 may track and maintain this information in association with information about the path taken by the virtual paintbrush 304 over the virtual canvas 302. The determined rate of bending and curvature change may be effective to predict where on the virtual canvas 302 the virtual paintbrush is likely to move. In addition to curvature and velocity, the PB&L simulation module 110 may also track an acceleration of the brush, and maintain this information with that maintained about the path. The information about the acceleration of the virtual paintbrush 304 may also be useful to predict where on the virtual canvas 302 the virtual paintbrush 304 is likely to move.

Consider an example in which an input is received to perform brush strokes with the virtual paintbrush 304 generally in the direction depicted by the arrow 310, e.g., upwards and to the right. Consequently, the PB&L simulation module 110 may determine a velocity of the virtual paintbrush 304 based on the brush strokes received. The PB&L simulation module 110 may also consider the prior trajectory and acceleration of the virtual paintbrush 304 in conjunction with the determined velocity. The PB&L simulation module may do so by analyzing the information maintained about the path taken by the virtual paintbrush 304 over the virtual canvas 302. The PB&L simulation module 110 may then change the region according to the prior trajectory and acceleration of the virtual paintbrush 304 as well as the determined velocity, e.g., by moving the region for which the lifelike qualities are simulated up and to the right and at a speed indicated by the velocity. If input is then received to perform brush strokes with the virtual paintbrush 304 upward and to the left (not shown), the PB&L simulation module 110 may then move the region within which the lifelike qualities are simulated up and to the left. In this way, the region within which the lifelike paint qualities are simulated may "follow" the virtual paintbrush 304.

With regard to the trajectory, the PB&L simulation module 110 may be configured to change the region so that the virtual paint 306 along the path taken by the virtual paintbrush 304 is kept in the region. In other words, the virtual paint 306 along the path that was laid more recently may more heavily influence the change of the region. In this way, the simulation of the virtual paint 304 along the newer portions of the path may be simulated longer (e.g., until simulation of its fluid properties is ceased) than if just the velocity is considered.

As depicted in FIG. 3, the location at which the virtual paintbrush 304 is displayed in the region 308 may be offset from a center of the region 308. In particular, the display location of the virtual paintbrush 304 may be based on the determined velocity. An amount that the virtual paintbrush 304 is offset from the center of the region 308, for instance, may be based on the speed component of the determined velocity. When the virtual paintbrush 304 moves over the virtual canvas 302 at greater speeds, the offset from the center of the region 308 may be greater than when the virtual paintbrush 304 moves over the virtual canvas 302 at slower speeds. In one or more implementations, when the virtual paintbrush 304 is still (e.g., input is not being received to perform brush strokes to move the virtual paintbrush 304 over the virtual canvas 302), it may be displayed at a center of the region 308.

Furthermore, a direction in which the virtual paintbrush 304 is offset from the center of the region 308 may be based on a direction component of the determined velocity. For example, when the virtual paintbrush 304 moves over the virtual canvas 302 in the direction of the arrow 310 (e.g., upwards and to the right) the virtual paintbrush 304 may be offset from the center of the region 308 in that same direction. When the virtual paintbrush 304 moves over the virtual canvas 302 in a direction upwards and to the left, however, the direction of the offset may be upwards and to the left of the center. In a similar manner, the offset may be downward and to the left, downward and to the right, just up, just down, just right, just left, and so forth depending on a direction the virtual paintbrush 304 is moved over the virtual canvas 302.

A size of the region 308 may also be based on the determined velocity of the virtual paintbrush 304 as it is moved over the virtual canvas 302. For example, the size of the region 308 may inversely correlate to the speed the virtual paintbrush 304 is moved, such that when the virtual paintbrush 304 is moved at faster speeds, the region 308 is smaller than when the virtual paintbrush 304 is moved at slower speeds. In this way, the computing resources may "keep up" with simulation of the lifelike qualities within the region 308 when the virtual paintbrush 304 is moved quickly.

As the region within which the lifelike paint qualities are simulated changes, the PB&L simulation module 110 may cease simulating some of the lifelike paint qualities for the virtual paint 306 not located within the region. Consider an example in which the PB&L simulation module 110 simulates lifelike paint qualities within a "current" region of the virtual canvas 302, such as the region 308. Consider also that prior to simulating the lifelike paint qualities for the current region, the PB&L simulation module 110 simulated those qualities for regions that were previously considered the current region. A region that was considered the current region just before the current region may be considered a "previously-simulated" region. Said another way, the previously-simulated region is the region of the virtual canvas 302 for which the lifelike paint qualities were simulated just prior to simulation of those qualities within the current region.

Given the manner in which the virtual paintbrush 304 is configured to move over the virtual canvas 302, the current region may include a portion of the previously-simulated region as well as a portion of the virtual canvas that was outside the previously-simulated region. In an example in which the virtual paintbrush 304 is moved generally upward and to the right, the current region may include upper-right portions of the previously-simulated region as well as portions of the virtual canvas adjacent (e.g., in a direction upward and to the right) to those upper-right portions of the previously-simulated region. Based on such movement of the virtual paintbrush 304, the current region may not include lower-left portions of the previously-simulated region, however. The PB&L simulation module 110 may thus cease simulating the lifelike paint qualities for these lower-left portions of the previously-simulated region as part of changing to simulate those qualities for the current region.

Broadly speaking, the PB&L simulation module 110 may represent functionality to simulate interaction of the virtual paint 306 with the virtual paintbrush 304 and virtual canvas 302 in greater detail near the virtual paintbrush 304 and less detail away from the virtual paintbrush 304. It should be appreciated that the region within which the lifelike qualities are simulated for the interaction may be a variety of different shapes. By way of example and not limitation, the region within which the lifelike qualities are simulated may match a shape of the canvas (but smaller), it may be a circle, square, and so forth without departing from the spirit or scope of the techniques described herein. In one or more implementations, the region within which the lifelike qualities are simulated may be indicated by displaying a window bounding the region as in FIG. 3. The bounding window may have any of a variety of line colors or types, e.g., solid or dashed. In one or more implementations, there may be no particular indicator (e.g., no bounding window) displayed to indicate where the region, within which the lifelike qualities are simulated, ends and the unsimulated regions of the virtual canvas begin.

In addition, the PB&L simulation module 110 may represent functionality to change a size of the region 308 based, in part, on capabilities of the computing resources used to simulate the interaction of the virtual paint, the virtual paintbrush, and the virtual canvas. To do so, the PB&L simulation module 110 may determine capabilities (e.g., computing speeds, memory, presence/absence of dedicated hardware, and so forth) of the computing resources that will be used to simulate the lifelike qualities of the virtual painting within the region. Based on the determined capabilities, PB&L simulation module 110 may determine a size of the region for simulation such that the determined size is larger when the computing resources are considered to have "better" capabilities (e.g., faster computing speeds, more memory, the presence of dedicated hardware, and so on), and is smaller when the computing resources are considered to have lesser capabilities (e.g., slower computing speeds, less memory, the absence of dedicated hardware, and so on).

Regardless of a size or shape of the region, or which lifelike paint qualities are simulated within the region, the simulation may be performed by splitting the computational workload between multiple processing units. For example, the computing involved in simulating the interaction of the virtual paint, the virtual paintbrush, and the virtual canvas may be split between a first and second processing unit, such as a central processing unit (CPU) and a graphics processing (GPU). It should be appreciated that such computing may be split between more than two processing units without departing from the spirit or scope of the techniques described herein. By way of example and not limitation, some of the computations may be performed using dedicated hardware configured to perform a specific portion or portions of the simulation, e.g., a hardware-implemented bristle module configured to perform operations related to simulation of the bristles of the virtual paintbrush 304.

Figure 4:
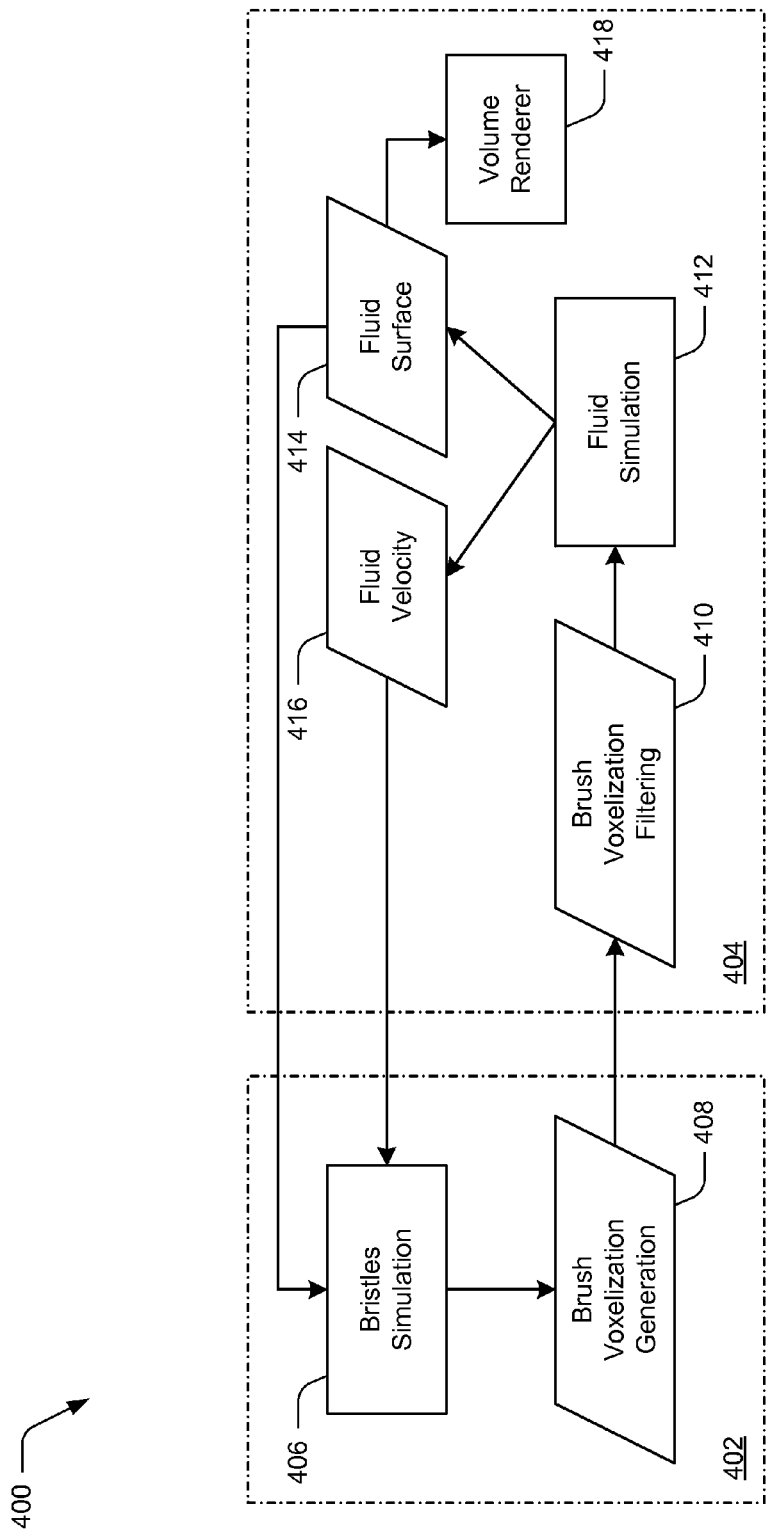
FIG. 4 illustrates an example in which simulation of the interaction between the virtual paint, paintbrush, and canvas is split between multiple different processing units.

FIG. 4 illustrates an example at 400 in which simulation of the interaction between the virtual paint, the virtual paintbrush, and the virtual canvas is split between multiple different processing units. In particular, FIG. 4 depicts a first processing unit 402 and a second processing unit 404. The first processing unit 402 and the second processing unit 404 may correspond respectively to the CPU 204 and the GPU 206 illustrated in FIG. 2.

In addition, FIG. 4 illustrates a variety tasks performed to simulate the interaction of the virtual paint, the virtual paintbrush, and the virtual canvas, as well as some components of the processing units to implement the simulation. The tasks depicted within the first processing unit 402 and the second processing unit 404 may represent which processing unit is configured to perform the respective task. Regardless of which task is performed by which processing unit though, the performance of the tasks is separated between multiple processing units. To enable separation of the workload, the processing units may be configured to communicate information (e.g., paintbrush bristle data 208, paint data 210, and canvas data 212) between one another to perform the various simulation tasks.

In the illustrated example, the first processing unit 402 includes tasks for a bristles simulation 406 and a brush voxelization generation 408. The bristles simulation 406 represents functionality of the first processing unit 402 to perform a mass-spring simulation for the bristles of the virtual paintbrush 304. When the bristles of a physical paintbrush contact paint, a canvas, or other bristles, for instance, they may react as if a spring-like force is being applied thereto—bending when contacting another surface or object and returning to a relaxed position after such contact. An amount each bristle bends may depend on a rigidity and mass of a bristle and a surface with which the bristle comes in contact. Further, a direction that each bristle bends at a given time may depend on an accumulation of forces applied to the bristle by different surfaces and objects in contact therewith.

The mass-spring simulation performed by the first processing unit 402 may therefore enable the bristles of the virtual paintbrush to appear to move in a similar fashion as a physical paintbrush. The bristles simulation 406 may represent functionality of the first processing unit 402 to perform the mass-spring simulation for "guide" bristles of the virtual paintbrush 304. The guide bristles may refer to the bristles of the virtual paintbrush 304 for which the position is individually simulated by the first processing unit 402. Using the position of the guide bristles, the position of the other bristles (e.g., the non-guide bristles) may be interpolated. Consider an example in which the virtual paintbrush 304 has 225 bristles, of which 21 are guide bristles. The bristles simulation 406 represents functionality to simulate the 21 guide bristles according to the mass-spring model. The position of the other 204 bristles, however, may be interpolated using the position of the 21 guide bristles determined based on their simulation. Thus, a position of the other 204 bristles may not be simulated using the mass-spring model.

Once such simulation and interpolation is performed, the brush voxelization generation 408 may be performed to convey the results thereof. The brush voxelization generation 408 represents functionality to generate data indicative of a position of each bristle within a three-dimensional (3D) volume that corresponds to the virtual paintbrush. In general, a "voxel" refers to a value represented on a regular grid in 3D space, the name being a combination of "volume" and "pixel". Each voxel may be associated with a value that indicates a number of bristles that are considered to be positioned in the voxel at a given time. When the simulation and interpolation indicate that no bristles are in a voxel, for instance, it has a value of zero. Accordingly, a voxel has a value of one when the simulation and interpolation indicate that one bristle is positioned in the voxel, two when the simulation and interpolation indicate that two bristles are positioned in the voxel, and so on.

Figure 5:
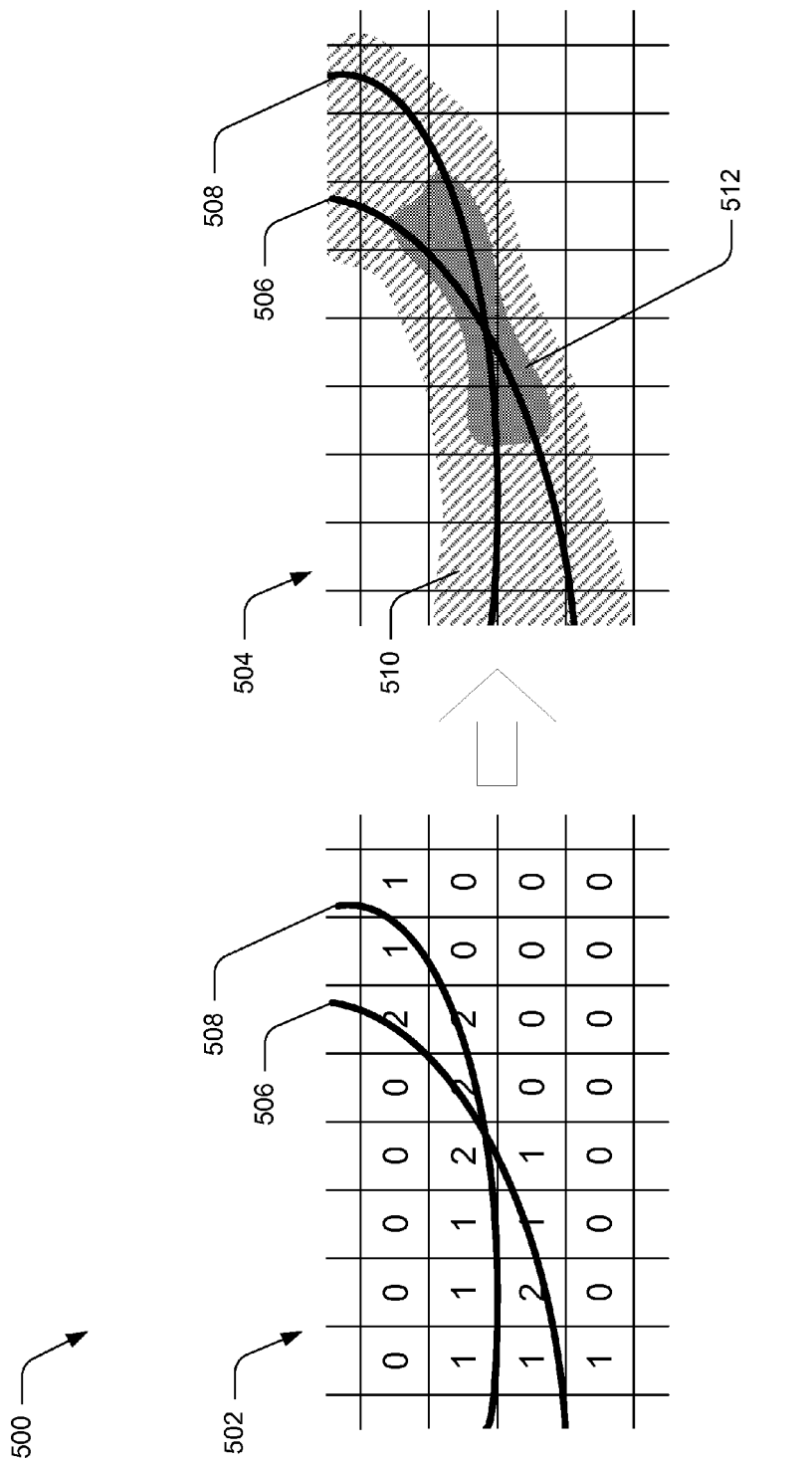
FIG. 5 illustrates an example of paintbrush bristle data computed at one processing unit and a corresponding portion of smoothed paintbrush bristle data that may be computed at another processing unit.

FIG. 5 illustrates at 500 an example portion of a voxelization of a virtual paintbrush and a portion of a smoothed voxelization that corresponds thereto. In particular, FIG. 5 includes a portion of a voxelization 502 and a portion of a smoothed voxelization 504, both of which are illustrated with lines 506, 508 which are representative of bristles. The portion of the voxelization 502 depicts a grid of boxes with numbers. Each box in the portion of the voxelization 502 represents a voxel, and the number indicates a number of bristles of the virtual paintbrush 304 that are considered positioned in the voxel.

In the illustrated example, the boxes having a '0' are not considered to have any bristles positioned therein. On the other hand, the boxes having a '2' are considered to have two bristles positioned therein. The process of associating with a voxel a number that represents bristles considered to be positioned therein may be referred to "voxelization" of a paintbrush.

The result of the brush voxelization generation 408, the 3D grid with the numbers representative of bristles positioned in each voxel, may be referred to herein as a "bristle density map". The portion of the voxelization 502 may be representative of the information generated by the brush voxelization generation 408. Further, the bristle density map may correspond to the paintbrush bristle data 208 of FIG. 2. Once the bristle density map is computed by the first processing unit 402 it may be communicated to the second processing unit 404.

The second processing unit 404 is illustrated as having tasks for brush voxelization filtering 410, fluid simulation 412, fluid surface 414, and fluid velocity 416, as well as having a volume renderer 418. The brush voxelization filtering 410 represents functionality to smooth the bristle density map that results from the brush voxelization generation 408. With reference to FIG. 5, the portion of the smoothed voxelization 504 may be representative of the information that results from the brush voxelization filtering 410. In particular, portions 510 and 512 may represent portions of a "smoothed" version of a bristle density map. Portion 510, for instance, may represent a lesser density of bristles than portion 512. By way of example, portion 510 may represent that a corresponding portion of the virtual paintbrush 304 is likely to have one bristle positioned therein. In contrast, portion 512 may represent that a corresponding portion of the virtual paintbrush 304 is likely to have two bristles positioned therein. In any case, it should be appreciated that portions 510, 512 are not constrained to the boxes in the manner that the portion of the voxelization 502 is constrained. Rather, portions 510, 512 have smoothed boundaries.

To smooth a bristle density map that that results from the brush voxelization generation 408, the brush voxelization filtering 410 may apply a Gaussian filter. In addition or alternately, the brush voxelization filtering 410 may represent functionality of the second processing unit 404 to smooth a bristle density map using a variety of filters other than a Gaussian filter without departing from the spirit or scope of the techniques described herein. Regardless of a type of filter applied, the brush voxelization filtering 410 may result in a smoothed bristle density map.

The second processing unit 404 may then use the smoothed bristle density map to stir liquids (e.g., virtual paint 306) and resolve bristle-to-bristle collision. By way of example, the smoothed bristle density map may constrain simulation of the virtual paint 306 such that the smoothed bristle density map acts as a boundary for the virtual paint 306. A velocity of the virtual paintbrush 304, and thus a velocity of the bristles represented by the smoothed bristle density map, may also be used to simulate the virtual paint. The velocity of the bristles may be represented by a bristle velocity map that is weighted by density as boundary speed.

In the illustrated example, the fluid simulation 412 represents functionality of the second processing unit 404 to perform a volumetric liquid simulation of virtual paint on a virtual canvas. The fluid simulation 412 may involve the fluid surface 414 task and the fluid velocity 416 task. The fluid surface 414 task may represent functionality of the second processing unit 404 to compute a fluid surface map of the virtual paint. The fluid surface map may be understood as representing a topography of the virtual paint on the virtual canvas. The fluid surface map computed in conjunction with the fluid surface 414 task, may enable volume renderer 418 to compute a volume of the virtual paint 306. To do so, the volume renderer 418 may allocate a volumetric uniform grid that covers the entire virtual canvas 302 in the second processing unit 404 as volume texture.

The fluid velocity 416 task may represent functionality of the second processing unit 404 to compute information indicative of qualities of the virtual paint 306 according to its velocity. To do so, the fluid velocity 416 task may determine whether the virtual paint under consideration is highly viscid (e.g., oil paint, and the like) or is not highly viscid (e.g., water color, Asian painting, and so forth). Paint with high viscosity may be considered to have low velocity and quick diffusion. When the virtual paint simulated corresponds to a highly viscid paint, the fluid velocity 416 task may simulate a small volume of virtual paint around the virtual paintbrush 304 within an adaptive grid. For example, a small simulation grid that is adaptive and follows the virtual paintbrush 304 may be simulated. With paint that is not highly viscid the simulation grid may adapt such that a larger simulation gird that follows the virtual paintbrush 304 may be simulated. Nevertheless, the fluid velocity 416 task enables the fluid simulation 412 to simulate fluid behavior near the brush such that the virtual paint near the brush flows with a detailed flow pattern. The fluid simulation 412 does not simulate fluid behavior that results in the detailed flow patterns further away from the virtual paintbrush, however. This may reflect the observation that in the physical world paint further away from a brush bristle may have already slowed down due to viscosity or seepage into canvas.

The information generated by the brush voxelization filtering 410 and the various parts of the fluid simulation 412 may then be communicated to the first processing unit 402 for use in the bristles simulation 406. For example, the smoothed bristle density map may be downsampled and copied to the first processing unit 402. The downsampled version of the smoothed bristle density map may be used in the bristles simulation 406 to resolve inter-bristle collision of the virtual paintbrush 304. According to the mass-spring simulation, the bristles simulation 406 may apply a force in a gradient descending direction on the smoothed bristle density map.

Fluid velocity information that is derived from the fluid velocity 416 task may also be downsampled and copied to the first processing unit 402. This fluid velocity information may be used by the bristles simulation 406 to apply a drag force to the bristles of the virtual paintbrush 304. The fluid surface map computed in conjunction with the fluid surface 414 task may also be communicated to the first processing unit 402. The fluid surface map may be used in the bristles simulation 406 as a boundary for the bristles of the virtual paintbrush. For example, the bristles simulation 406 may project a bristle back if it penetrates the virtual canvas or dry virtual paint. In addition, the bristles simulation 406 task may apply a dynamic force of friction to the bristles of the virtual paintbrush 304 based on the boundary conditions that result from the fluid surface map.

This separation of simulation tasks between the multiple processing units may continue throughout the simulation of the interaction between the virtual paint, the virtual paintbrush, and the virtual canvas. Further, the information generated (e.g., the smoothed bristle density map, the fluid surface map, the fluid velocity information, and so on) may be usable to render the simulation for display via a display device.

Having discussed example details of the techniques for paintbrush and liquid simulation, consider now some example procedures to illustrate additional aspects of the techniques.

Example Procedures

This section describes example procedures for paintbrush and liquid simulation in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as example computing devices 102, 202 of FIGS. 1 and 2 that make use of a PB&L simulation module 110.

Figure 6:
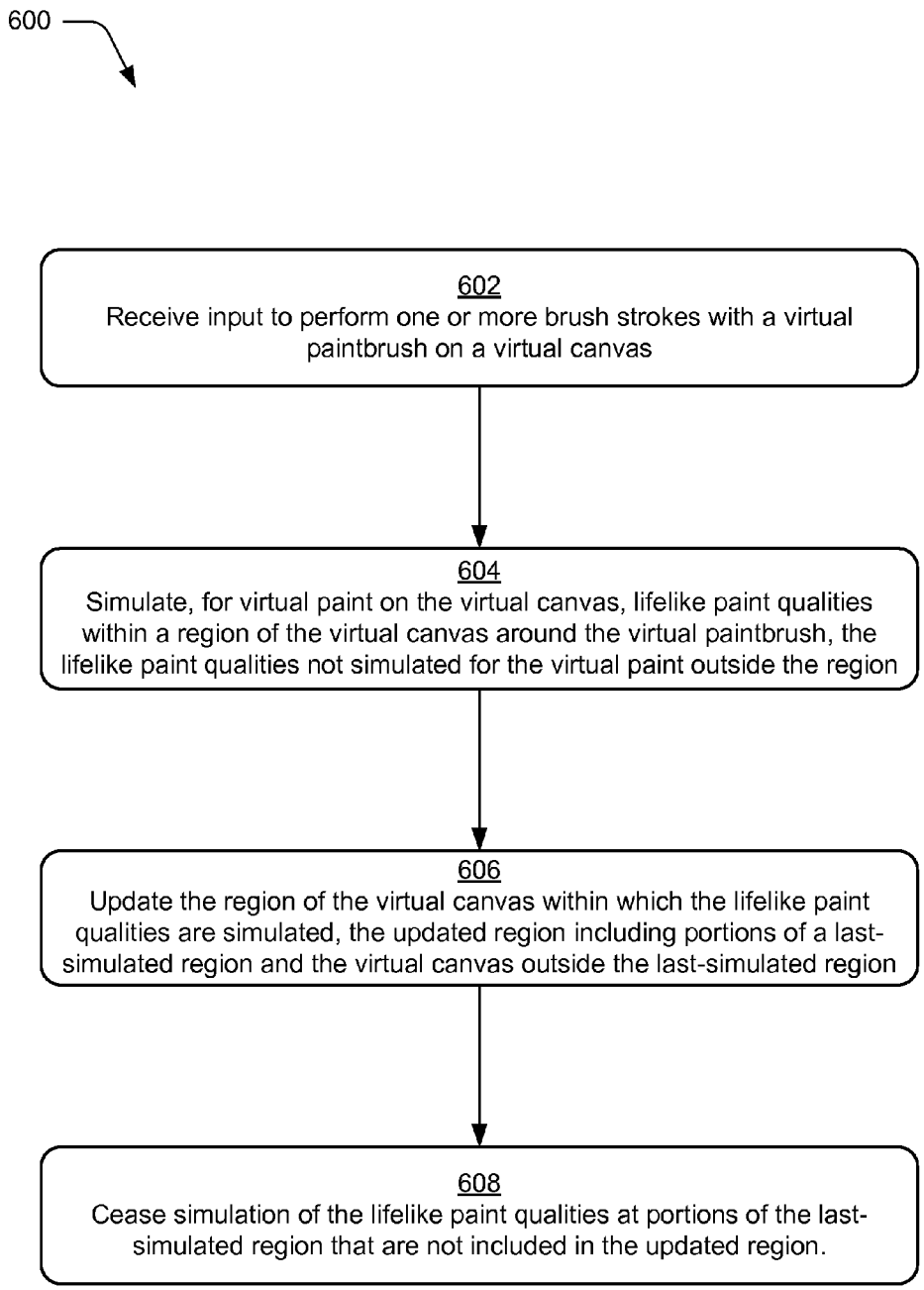
FIG. 6 is a flow diagram depicting a procedure in an example implementation in which interaction of a virtual paintbrush, paint, and canvas is simulated for a region of the canvas.

FIG. 6 depicts an example procedure 600 in which interaction of a virtual paintbrush, virtual paint, and a virtual canvas is simulated for a region of the canvas. Input is received to perform one or more brush strokes with a virtual paintbrush on a virtual canvas (block 602). For example, a user may perform input via a painting application to make brush strokes with the virtual paintbrush 304 on the virtual canvas 302. The input may be performed by dragging a mouse and holding down one or more buttons of the mouse, by swiping a finger across a touch screen, by swiping a stylus across screen, and so on. It is to be appreciated that a variety of different types of user input may be received to make brush strokes with the virtual paintbrush 304 on the virtual canvas 302. In conjunction with the virtual brush strokes, the virtual paint 306 may be deposited on the canvas.

For virtual paint on the virtual canvas, lifelike qualities are simulated within a region of the virtual canvas that is around the virtual paintbrush (block 604). Outside the region, however, the lifelike paint qualities are not simulated for the virtual paint. For example, the PB&L simulation module 110 simulates lifelike paint qualities (e.g., flow, seepage, and so on) for the virtual paint 306 that is located within the region 308. However, the PB&L simulation module 110 does not simulate the lifelike paint qualities for the virtual paint 306 that is located outside of the region 308. The region for which the lifelike paint qualities are simulated corresponds to a portion of the virtual canvas 302 near the virtual paintbrush 304. When the virtual paintbrush 304 moves across the canvas according to newly received brush strokes, the region for which the lifelike qualities are simulated follows the virtual paintbrush 304. With reference to FIG. 3, the region 308 may follow the virtual paintbrush 304 upward and rightward when input is received to make strokes upward and rightward, as is indicated by the arrow 310. The region may follow the virtual paintbrush 304 in a similar manner when input is received to make strokes in other directions.

Additional brush strokes may be received. As a result, the region within which the lifelike qualities are simulated is updated (block 606). The updated region includes portions of a previously-simulated region and portions of the virtual canvas outside the previously-updated region. As input is received to make brush strokes in the direction indicated by the arrow 310, for instance, the PB&L simulation module 110 updates the region for which the lifelike paint qualities are simulated to follow the virtual paintbrush 304. At a first time, the region 308 may correspond to a currently-simulated region.

At a second time after the first time (e.g., when a display of the simulation is next updated), however, the region 308 may correspond to a previously-simulated region. At the second time, the PB&L simulation module 110 thus simulates the lifelike qualities for a region that is upward and rightward from the region 308. The region for which the PB&L simulation module 110 simulates the lifelike paint qualities may include portions of the virtual canvas that were not in the previously-simulated region, e.g., the region 308 in the continuing example. Nevertheless, portions of the region 308 may still be within the region having the lifelike paint qualities simulated. Thus, when the region 308 corresponds to the previously-simulated region, the PB&L simulation module 110 may simulate the lifelike paint qualities for an updated region that includes some portions of the region 308 and some portions of the virtual canvas 302 outside of the region 308.

Simulation of the lifelike qualities is ceased at portions of the previously-simulated region that are not included in the updated region (block 608). Continuing with the example in which the region 308 corresponds to the previously-simulated region, the PB&L simulation module 110 may cease simulation of those portions of the region 308 that are not included in the updated region. The updated region may not include lower-left portions of the region 308, for instance, when input is received to make brush strokes in the direction indicated by the arrow 310. Consequently, the PB&L simulation module 110 may cease simulation of the lifelike painting qualities for the virtual paint 306 located in the lower-left portion of the region 308 when the region is updated.

Figure 7:
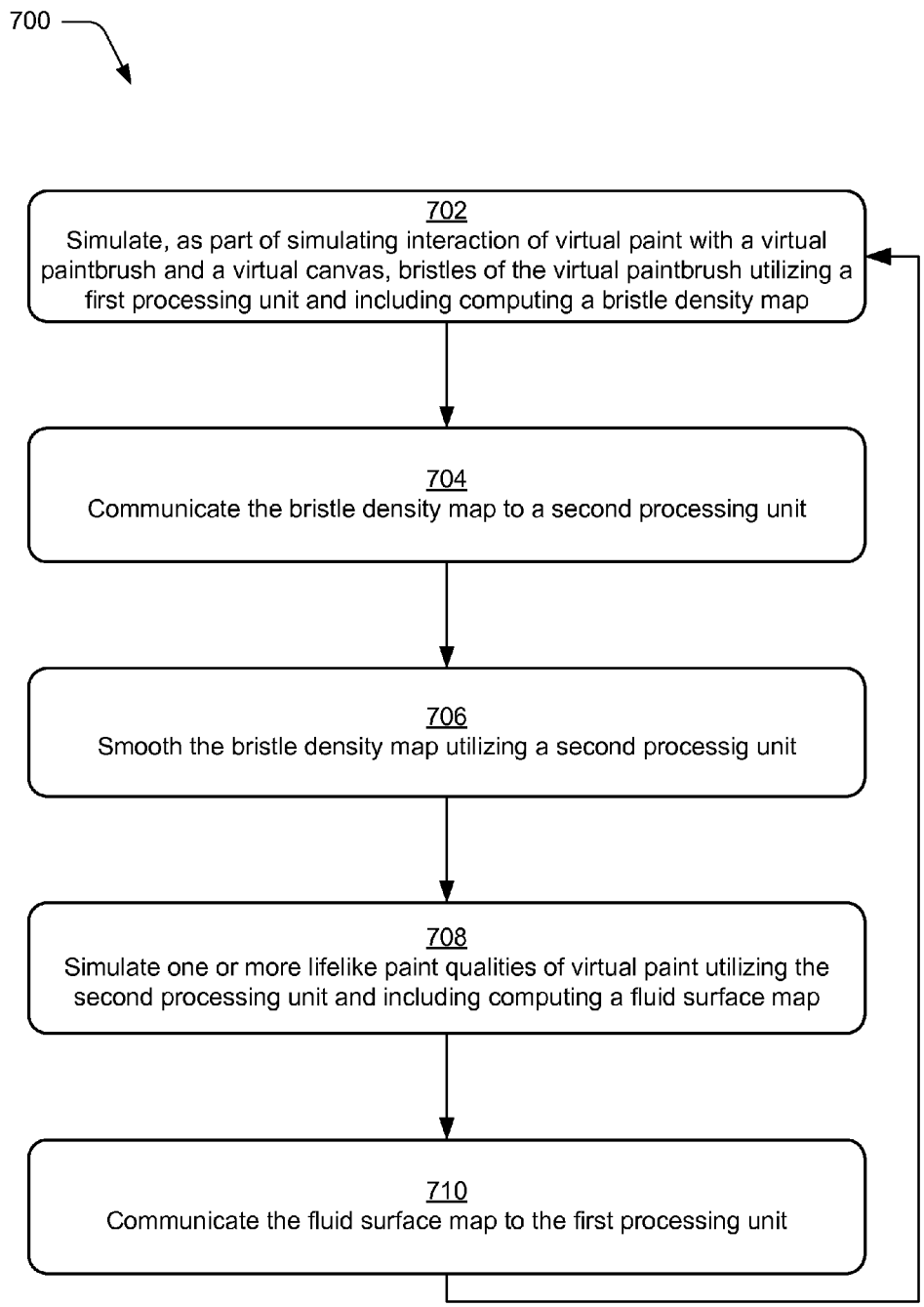
FIG. 7 is a flow diagram depicting a procedure in an example implementation in which acts performed in conjunction with paintbrush and liquid simulation are split between a first and second processing unit.

FIG. 7 depicts an example procedure 700 in which acts performed in conjunction with paintbrush and liquid simulation are split between a first and second processing unit. As part of simulating interaction of virtual paint with a virtual paintbrush and a virtual canvas, bristles of the virtual paintbrush are simulated utilizing a first processing unit (block 702). In conjunction with simulating the bristles of the virtual paintbrush, a bristle density map is computed. For example, the PB&L simulation module 110 employs the first processing unit 402, which may correspond to the CPU 204, to perform the bristles simulation 406. The CPU 204 may perform the bristles simulation 406 as part of simulating the interaction between the virtual paint 306 with the virtual paintbrush 304 and the virtual canvas 302. Once the bristles are simulated, the CPU 204 may compute a bristle density map, which may correspond to the paintbrush bristle data 208

The bristle density map is communicated to the second processing unit (block 704). For example, the PB&L simulation module 110 causes the bristle density map that is computed at the CPU 204 to be copied over to the second processing unit 404, which may correspond to the GPU 206. Utilizing the second processing unit, the bristle density map is smoothed (block 706). For example, the GPU 206 may apply a Gaussian filter to the bristle density map. The smoothed bristle density map computed by the GPU 206 may then be used to stir the paint and for inter-bristle collision.

The second processing unit is utilized to simulate lifelike painting qualities of the virtual paint (block 708). In conjunction with simulating the lifelike paint qualities, a fluid surface map is computed. For example, the PB&L simulation module 110 employs the GPU 206 to perform the fluid surface 414 task and the fluid velocity 416 task for the virtual paint 306 within the region 308. In conjunction with these tasks, the GPU 206 may compute a fluid surface map and fluid velocity information.

The fluid surface map is communicated to the first processing unit (block 710). For example, the PB&L simulation module 110 causes the fluid surface map and the fluid velocity information to be downsampled and copied to the CPU 204. At the CPU 204, the fluid surface map may be used as a boundary for simulating the bristles of the virtual paintbrush 304, e.g., as part of the bristles simulation 406. The fluid velocity information may be used in the bristles simulation 406 at the CPU 204 to apply a drag force to the bristles of the virtual paintbrush 304.

The acts corresponding to blocks 702-710 may be repeated throughout simulation of the interaction between the virtual paint 306, the virtual paintbrush 304, and the virtual canvas 302. To the extent that multiple different processing units are used, it is to be appreciated that the acts corresponding to these blocks may be performed in parallel. For example, the bristles of the virtual paintbrush may be simulated at a same time that a fluid surface map is being computed.

Having described example procedures in accordance with one or more implementations, consider now an example system and device that can be utilized to implement the various techniques described herein.

Example System and Device

Figure 8:
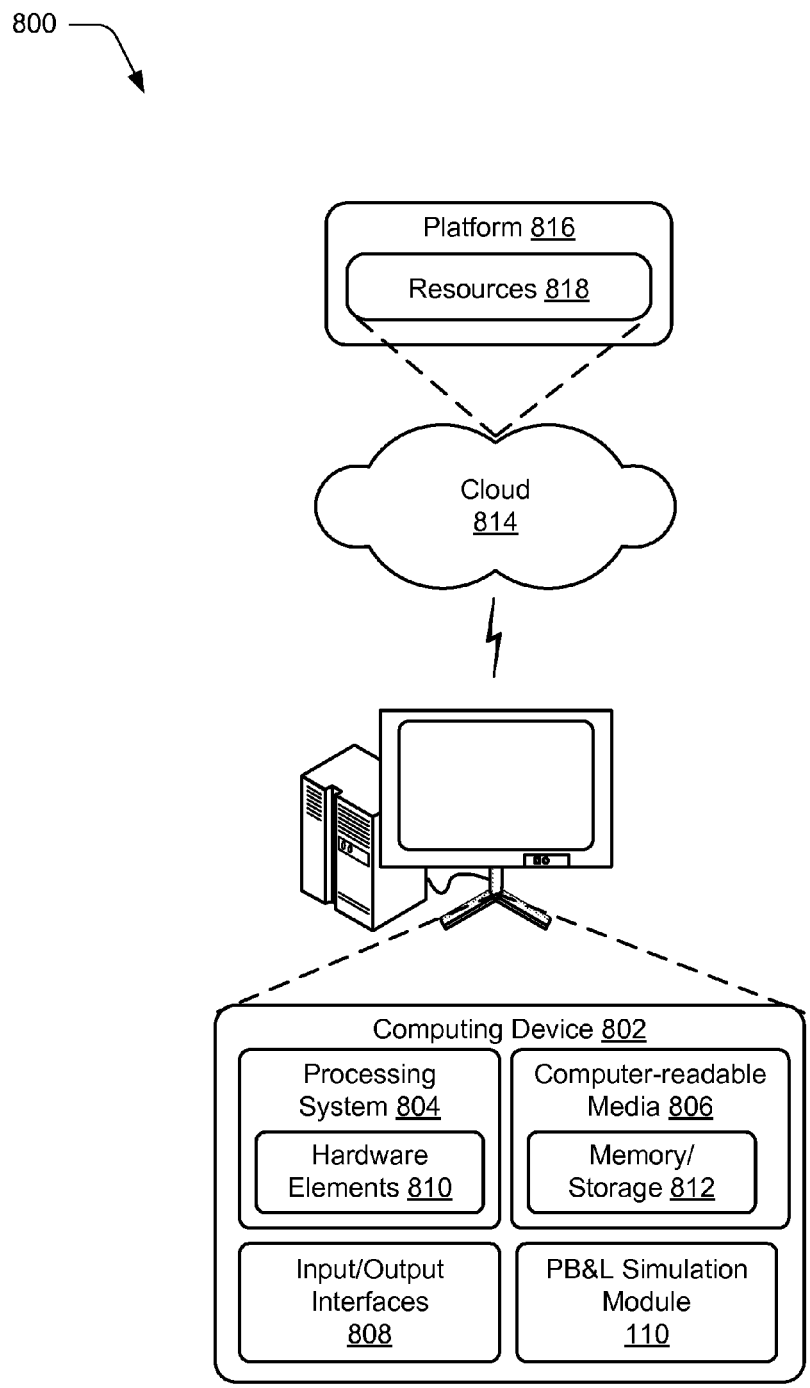
FIG. 8 illustrates an example system including various components of an example device that can be employed for one or more implementations of paintbrush and liquid simulation techniques described herein.

FIG. 8 illustrates an example system generally at 800 that includes an example computing device 802 that is representative of one or more computing systems and/or devices that may implement the various techniques described herein. This is illustrated through inclusion of the PB&L simulation module 110, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its qualities set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device implementation, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a virtual paint environment to simulate lifelike qualities of paint for virtual paint, a method implemented by a computing device, the method comprising:
   receiving, by the computing device, input describing one or more brush strokes of a virtual paintbrush on a virtual canvas; and
   simulating, by the computing device, for virtual paint on the virtual canvas, one or more lifelike paint qualities within a region of the virtual canvas that follows a location of the virtual paintbrush and the region being a size based, in part, on at least one of computing speed or amount of memory of the computing device used to simulate the one or more lifelike paint qualities, the one or more lifelike paint qualities not being simulated for the virtual paint outside the region, and the one or more lifelike paint qualities being simulated based in part on interaction of the virtual paintbrush with the virtual paint according to the one or more brush strokes.

2. A method as described in claim 1, wherein the region in which the one or more lifelike painting qualities are simulated follows the virtual paint brush based on a trajectory of the virtual paint brush.

3. A method as described in claim 1, further comprising:
   updating, by the computing device, the region of the virtual canvas within which the one or more lifelike painting qualities are simulated, the updated region including at least a portion of a previously-simulated region of the virtual canvas and a portion of the virtual canvas outside the previously-simulated region; and ceasing simulation of the one or more lifelike painting qualities for the virtual paint at portions of the previously-simulated region that are not included in the updated region.

4. A method as described in claim 3, further comprising determining, by the computing device, the updated region according to one or more additional brush strokes.

5. A method as described in claim 3, wherein ceasing the simulation of the one or more lifelike painting qualities involves ceasing simulation of fluid qualities of the virtual paint, including:

flow of the virtual paint on the virtual canvas; and
seeping of the virtual paint into the virtual canvas.

6. A method as described in claim 1, further comprising:
displaying a portion of the virtual canvas that includes the region within which the one or more lifelike painting qualities are simulated; and
displaying the virtual paintbrush within the region and offset from a center of the region, the offset based in part on a direction of the one or more brush strokes.

7. A method as described in claim 1, wherein the one or more lifelike painting qualities that are simulated include an appearance of the virtual paint.

8. A method as described in claim 1, wherein the one or more lifelike painting qualities that are simulated include flow of the virtual paint between the virtual canvas and the virtual paintbrush.

9. A method as described in claim 1, wherein the simulating includes computing a fluid surface map and information indicative of fluid velocity for the virtual paint, the fluid surface map and the information indicative of the fluid velocity being usable to simulate bristles of the virtual paintbrush.

10. A method as described in claim 1, wherein an amount of visual detail with which simulated lifelike painting qualities are displayed decreases as a distance from the virtual paintbrush increases.

11. In a virtual paint environment to simulate lifelike qualities of paint for virtual paint, a method implemented by a computing device, the method comprising:

simulating, by the computing device, as part of a simulation that simulates interaction of virtual paint with a virtual canvas and a virtual paintbrush, bristles of the virtual paintbrush utilizing a first processing unit; and simulating, by the computing device, one or more lifelike paint qualities of the virtual paint utilizing a second processing unit that is separate from the first processing unit, the one or more lifelike paint qualities being simulated within a region of the virtual canvas that follows the virtual paint brush and the region being a size that is based, in part, on computing speed of at least one of the first processing unit or the second processing unit.

12. A method as described in claim 11, wherein simulating the bristles of the virtual paintbrush includes computing a bristle density map that represents bristle distribution within a volume that corresponds to the bristles of the virtual paintbrush.

13. A method as described in claim 11, wherein the bristles of the virtual paintbrush are simulated according to mass-spring simulation techniques.

14. A method as described in claim 11, wherein simulating the one or more lifelike paint qualities includes computing a fluid surface map that represents paint topography of the virtual paint deposited on the virtual canvas.

15. A method as described in claim 11, further comprising:

communicating a bristle density map to the second processing unit, the bristle density map having been computed utilizing the first processing unit;

smoothing the bristle density map utilizing the second processing unit, the smoothed bristle density map being used by the second processing unit to simulate the one or more lifelike paint qualities of the virtual paint; and communicating a fluid surface map to the first processing unit, the fluid surface map having been computed by the second processing unit and being used by the first processing unit to simulate the bristles of the virtual paintbrush.

16. A system comprising:
a processing system including at least a first processing unit and a second processing unit; and
memory configured to maintain instructions that are executable by the processing system to simulate interaction of virtual paint with a virtual paintbrush on a virtual canvas by performing operations comprising:
employing the first processing unit to simulate bristles of the virtual paintbrush, simulation of the bristles involving computation of a volumetric representation of the bristles; and
employing the second processing unit to simulate one or more lifelike paint qualities of the virtual paint within a region of the virtual canvas that follows the virtual paintbrush, simulation of the one or more lifelike paint qualities involving computation of a topography of the virtual paint based in part on the volumetric representation of the bristles, and the region being a size based, in part, on computing speed of at least one of the first processing unit or the second processing unit.

17. A system as described in claim 16, wherein the first processing unit is a central processing unit (CPU).

18. A system as described in claim 16, wherein the second processing unit is a graphics processing unit (GPU).

19. A system as described in claim 16, wherein the one or more lifelike paint qualities are not simulated for the virtual paint outside the region.

20. A system as described in claim 16, wherein the operations further comprise employing the second processing unit to render a volume of the virtual paint using the topography of the virtual paint.

* * * * *